United States Patent Office 3,749,579
Patented July 31, 1973

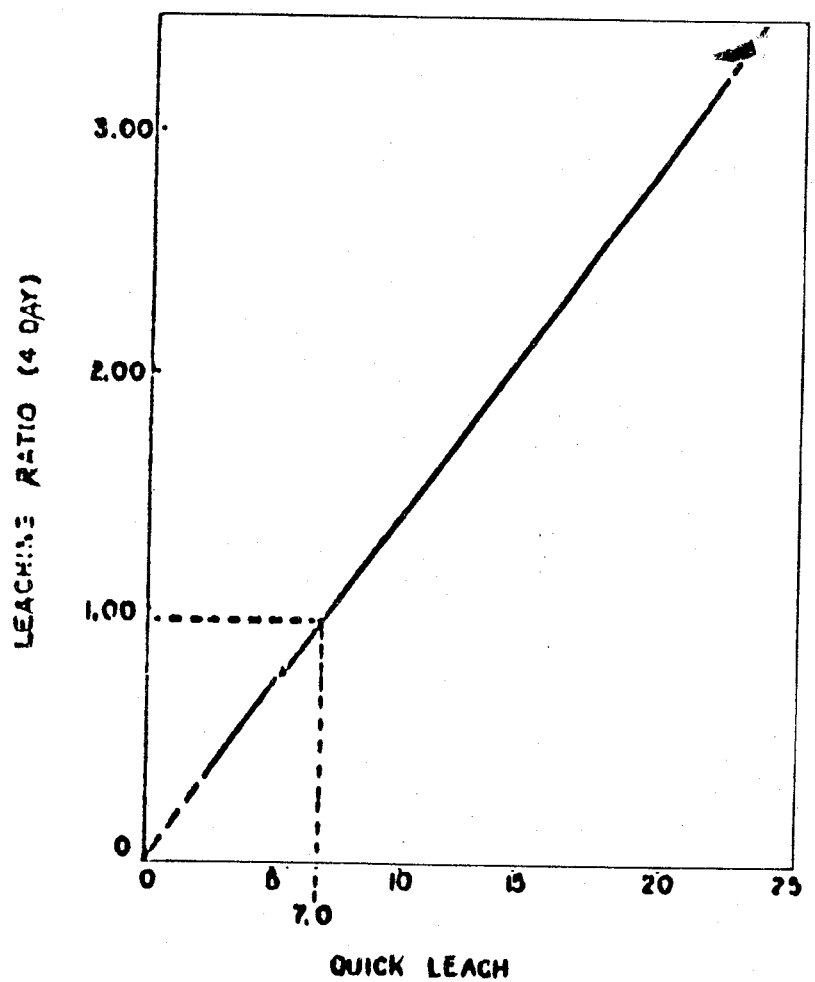

3,749,579
IODINE SOURCE FOR ANIMAL FEEDING IN SALT BLOCK FORM
George F. Andelfinger and Eugene J. Kuhajek, Woodstock, Ill., assignors to Morton-Norwich Products, Inc., Chicago, Ill.
Original application Aug. 28, 1967, Ser. No. 663,784, now Patent No. 3,526,508, dated Sept. 1, 1970. Divided and this application Dec. 2, 1969, Ser. No. 881,570
Int. Cl. A23k 1/175; A61k 27/00, 9/00
U.S. Cl. 99—2 CD     3 Claims

ABSTRACT OF THE DISCLOSURE

An assimilable source of iodine for the effective supplementation of the diet of animals is provided in the form of a salt block containing a major proportion of sodium chloride and a minor proportion of pentacalcium orthoperiodate. The block is characterized by the resistance of the pentacalcium orthoperiodate to preferential aqueous leaching from the block when exposed to moisture of the elements in the form of rain or snow.

CROSS-REFERENCE TO RELATED APPLICATIONS

This invention is a divisional of our application Ser. No. 663,784 filed Aug. 28, 1967, now U.S. Pat. No. 3,526,508.

BACKGROUND OF THE INVENTION

(1) Field of the invention

The field of this invention is broadly that of iodine supplementation of the diet of animals, and the compositions and means for providing such supplementation.

Mineral elements in general and specifically iodine have been well established as essential elements in the nutrition of both man and animals.

The following, from the publication "Nutrient Requirements of Dairy Cattle," National Academy of Sciences National Research Council, Third Revised Edition, page 8 (1966) Publication 1349, is indicative of the need in general for mineral elements in the diet of dairy cattle:

"The mineral elements required by dairy cattle are: Calcium, phosphorous, magnesium, potassium, sodium, chloride, sulfur, iodine, iron, copper, cobalt, manganese, zinc, and selenium. These mineral elements are needed for bone formation, as constituents of the proteins and lipids that make up the muscles, organs, blood cells, and other soft tissues, and in many enzyme systems of the body. They are concerned in the maintenance of osmotic relationships and acid-base equilibria, and exert characteristic effect on the irritability of muscles and nerves."

Page 10 of this same reference sets forth the necessity of iodine in the diet of cattle:

"The lack of iodine is recognized as the principal cause of goiter in newborn calves. The goiter areas are found primarily around the Great Lakes and Westward to the Pacific coast. In these regions, iodine supplements have been shown to be necessary. The use of iodized salt containing 0.015 percent iodine incorporated at a 1 percent level of the grain ration has proved effective. When iodized salt is stabilized to retard loss of iodine, a product containing 0.0076 percent iodine (0.01 percent potassium iodide) will probably provide the needed iodine supplementation. The use of stabilized iodine is recommended as a supplement to the ration of pregnant cows on farms where goiter has been known to occur among newborn calves."

Other publications of the National Academy of Sciences National Research Council, relating to "Nutrient Requirements of Domestic Animals" detail the essentiality of iodine in the diets of swine, sheep, and laboratory animals.

(2) Description of the prior arts

It is conventionel in the dairy and livestock industries to supplement animal diets with trace minerals proven essential for good nutrition. One method of conveniently accomplishing this is by incorporating the necessary trace minerals into an animal feed or in loose salt. Another method of conveniently accomplishing this is by incorporating the necessary trace minerals into blocks of salt which are randomly placed in the pasture for the animal to lick according to its natural desire for salt. This type of dietary supplementation is known as ad libitum or "free choice" feeding and is believed by nutritionists to be a good means for providing those elements which are apt to be lacking in the ordinary diet.

A salt block is generally formed by high pressure compression of salt into a self-supporting form, usually rectangular in cross-section and weighing about 50 pounds. When placed in the pasture, the block is exposed to weathering and leaching by water. It is therefore important that none of the trace minerals is preferentially leached from the block by rain or snow leaving the block deficient with respect to a specific mineral.

Substances currently being used as a source for iodine in a salt block are potassium iodide, thymol iodide, calcium iodate, ethylenediamine dihydroiodide and diiodosalicylic acid. Potassium iodide, calcium iodate and ethylenediamine dihydroiodide are good nutritional sources of iodine but have the disadvantage of being preferentially leached from a salt block by rain or snow, leaving the surface of the block deficient or even entirely void of iodine. Diiodosalicylic acid has excellent leach resistance, but its nutritional availability or assimilability has been questioned. Thymol iodide is relatively expensive.

Accordingly, it would be desirable to overcome these disadvantages of the presently used iodine sources in order to provide more effective dietary supplementation.

It is therefore an object of the present invention to provide a novel, nontoxic, nutritionally available and easily assimilable iodine source for animal feeding.

It is another object of the present invention to provide a method for iodine supplementation of an animal diet by free choice feeding from a salt block containing an iodine source which is not preferentially leached by water from said salt block.

It is another object of the present invention to provide a novel, nutritionally available iodine source for incorporation in a salt block, which iodine source is resistant to preferential aqueous leaching therefrom.

It is a further object of the present invention to provide a simple, efficient and relatively inexpensive process for preparing said iodine source.

It is a still further object of the present invention to provide salt block compositions containing an assimilable, nutritionally available iodine source which is resistant to preferential aqueous leaching therefrom.

It is another object of the present invention to provide a method for preparing salt block compositions containing an assimilable iodine source for animal diet supplementation, which iodine source is not leached from said salt block by rain or snow.

The fulfillment of these and other objects of this invention may be more readily appreciated by reference to the following specification, examples and appended claims.

SUMMARY OF THE INVENTION

The foregoing objects of this invention are accomplished by the preparation of pentacalcium orthoperiodate, $Ca_5(IO_6)_2$, to the novel use of such compound as a nutritionally available and easily assimilable source of iodine supplementation of animal diets, particularly when incorporated into salt blocks, to salt block compositions containing pentacalcium orthoperiodate as the principal iodine-bearing constituent such as, for example, in amounts of at least 0.005 weight percent of pentacalcium orthoperiodate, and to the preparation of such salt block compositions.

Broadly, according to the present invention, pentacalcium orthoperiodate is prepared by admixing calcium iodate with a basic compound selected from the group consisting of calcium hydroxide and calcium oxide in the concentration of from about 0.08 to about 0.5 mole of calcium iodate per mole of basic compound until thoroughly blended, heating the admixture to a temperature of from about 425° C. to about 550° C. to produce pentacalcium orthoperiodate, and cooling the resulting reaction product. The crude cooled reaction product may be washed with dilute acid until the pH of the washings is reduced to about 7, and thereafter the resulting insoluble residue dried. This acid washing step, using sulfuric acid or the like, produces a pentacalcium orthoperiodate product having a purity in excess of 90%.

The use of calcium iodate in a concentration in excess of about 0.5 mole per mole of basic compound results in excessive iodine volatilization during heating, a condition which not only is wasteful of iodine, but also presents problems with respect to equipment corrosion and iodine disposal or recovery. The use of less than about 0.08 mole of calcium iodate per mole of basic compound results in a final product which has substantial and undesirable proportions of unreacted basic compound. Calcium oxide or calcium hydroxide may be used interchangeably in the process, or a combination of the two may be employed, if desired. However, it has been found convenient to employ calcium hydroxide for routine production of the product.

A heating temperature substantially lower than about 425° C. results in a product which is characterized by an excessive calcium iodate content. An excessive calcium iodate concentration adversely affects the leach-resistant properties of the product when incorporated into a salt block. The optimum time of heating is approximately one hour, although, as is readily understood, heating for periods of time more or less than one hour does not materially affect the process or product.

More particularly, the preferred process for the preparation of pentacalcium orthoperiodate comprises thoroughly admixing calcium iodate with calcium hydroxide in the ratio of about 0.15 mole of calcium iodate per mole of calcium hydroxide, heating the admixture at a temperature of about 500° C. for a period of about one hour, cooling the mass and washing with dilute sulfuric acid until the washings have a pH of about 7, and thereafter drying the insoluble residue. As hereinbefore stated, this process yields substantially pure pentacalcium orthoperiodate.

Another of the foregoing objects of this invention is accomplished by the administration to animals of pentacalcium orthoperiodate as an iodine supplement. Administration is most easily accomplished in the case of livestock feeding by admixing said pentacalcium orthoperiodate with sodium chloride and compressing the admixture into a self-supporting form, usually a rectangular block. The so formed block is then placed where the animals graze so that they can partake thereof to satisfy their natural salt hunger and at the same time ingest iodine essential for good nutrition. The concentration of pentacalcium orthoperiodate used in a salt block is about 0.03 weight percent, which provides about 0.01 weight percent of iodine. It is understood that this concentration may be increased or decreased to as low as about at least 0.005 weight percent, as desired to achieve special nutritional effects.

For the purpose of incorporating pentacalcium orthoperiodate into loose salt, a salt block, or other animal feeds, it is convenient to incorporate directly into the feed the product obtained by omitting the step in the preparation of pentacalcium orthoperiodate which involves extraction with dilute acid to provide essentially pure pentacalcium orthoperiodate. It has been found that the product obtained by cooling the heated admixture of calcium iodate and calcium hydroxide, without acid extraction thereof, is essentially a basic pentacalcium orthoperiodate composition composed principally of pentacalium orthoperiodate as the major iodine-bearing compound in a matrix comprising minor proportions of calcium hydroxide, calcium carbonate, calcium oxide and calcium iodate. These matrix substances in admixture with pentacalcium orthoperiodate do not affect its performance as an assimilable iodine source which, when incorporated into a salt block, is resistant to preferential aqueous leaching therefrom. Further, these matrix substances are expressly permissible as components of an animal feed according to the applicable regulations of the Food and Drug Administration.

For these reasons, testing of pentacalcium orthoperiodate with respect to toxicity, assimilability and nutritional availability, rat feeding tests, and evaluations of resistance to aqueous leaching from a salt block has been conducted on basic pentacalcium orthoperiodate compositions. These tests, hereinafter more fully described, have demonstrated that pentacalcium orthoperiodate is both nontoxic and effective as a dietary supplement in preventing iodine deficiency. Pentacalcium orthoperiodate is quite insoluble in an aqueous alkaline or neutral medium. It is, however, soluble in an acidic medium. Investigation has shown that in an acidic medium such as abomasum juice, the gastric juice found in the fourth stomach of a bovine animal (pH 3.0), pentacalcium orthoperiodate is reduced to iodate and iodide, each of which is well established as a source of nutritionally available, easily assimilable iodine, and each of which is permissible as a trace mineral additive to animal feeds according to applicable regulations of the Food and Drug Administration.

This reduction to iodate and iodide is understandable in view of the fact that abomasum juice contains a variety of organic reducing substances and enzymes derived from pasture grasses, silage, grain, dry feed and molasses, e.g., cellibiose, starch, sugar (sucrose and arabinose), glycogen, arabitol, trypsin, pepsin, cysteine,[1] systine,[1] histidine,[1] protose (partially hydrolyzed protein), chlorophyll, nucleic acid, and *Lactobacillus acidophilus*.

Repeated laboratory tests have also established that each of the above substances in an acid medium is effective to reduce pentacalcium orthoperiodate to iodate and iodide in accordance with the following equation:

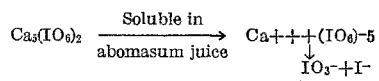

One disadvantage common to many of the currently used iodine sources is that, when incorporated into a salt block and exposed to the weathering action of rain and snow, they are preferentially leached or dissolved, leaving the surface of the block deficient or even entirely void of iodine. It was unexpectedly found that pentacalcium orthoperiodate, when incorporated into a salt block, is not preferentially leached therefrom by water. Under conditions of actual outdoor exposure to weathering for a period of twenty-eight days, it was found that the surface iodine content of a salt block containing pentacalcium orthoperiodate was essentially the same at the end of this time as it was when the block was originally formed. In addition to field trials under conditions of actual exposure to rain, laboratory tests, hereinafter more fully described, further establish that pentacalcium orthoperiodate is resistant to preferential dissolution from a salt block by

[1] Amino acid.

water and that the concentration of iodine in a salt block remains essentially constant under the most severe conditions of high humidity.

For a more complete understanding of the present invention, reference is now made to the following specific examples illustrating the preparation of essentially pure pentacalcium orthoperiodate, the preparation of compositions containing pentacalcium orthoperiodate as the principal iodine-bearing constituent, the evaluation of such compositions with respect to toxicity, nutritional availability and assimilability, and resistance to aqueous leaching when incorporated into a salt block, and to the preparation of salt blocks containing said compositions.

EXAMPLE 1

Preparation of essentially pure pentacalcium orthoperiodate

Calcium iodate and calcium hydroxide were dry-blended in the mole ratio of 0.15 mole of calcium iodate per mole of calcium hydroxide until a homogeneous mixture was obtained. The mass was then heated for one hour at a temperature from about 495° C. to about 520° C., after which time it was allowed to cool. The cooled admixture was washed with dilute sulfuric acid until the washings reached a pH of about 7. The residue was then dried to constant weight to yield pentacalcium orthoperiodate of about 93 percent purity.

EXAMPLE 2

Preparation of compositions containing pentacalcium orthoperiodate as the principal iodine-bearing constituent (mole ratio of calcium iodate to calcium hydroxide of 0.15:1)

Calcium iodate (43.34 grams) and calcium hydroxide (56.66 grams), a mole ratio of 0.15 mole of calcium iodate per mole of calcium hydroxide, were dry-blended until a homogeneous mixture was obtained. The mass was heated for one hour at 495° C., after which time the admixture was cooled to provide a composition containing pentacalcium orthoperiodate as the principal iodine-bearing compound with minor amounts of calcium oxide, calcium carbonate, calcium hydroxide and calcium iodate.

EXAMPLE 3

The procedure of Example 2 was repeated except that the temperature was 520° C.

EXAMPLE 4

Mole ratio of calcium iodate to calcium hydroxide of 0.08:1

The procedure of Example 2 was repeated except that 27.67 grams of calcium iodate were admixed with 72.33 grams of calcium hydroxide to provide a mole ratio of calcium iodate to calcium hydroxide of 0.08 to 1.

EXAMPLE 5

Mole ratio of calcium iodate to calcium hydroxide of 0.3:1

The procedure of Example 2 was repeated except that the temperature was 455° C. and 60.47 grams of calcium iodate were admixed with 39.53 grams of calcium hydroxide to provide a mole ratio of calcium iodate to calcium hydroxide of 0.3:1.

EXAMPLE 6

Mole ratio of calcium iodate to calcium hydroxide of 0.46:1

The procedure of Example 2 was repeated except that the temperature was 465° C. and 69.65 grams of calcium iodate were admixed with 30.35 grams of calcium hydroxide to provide a mole ratio of calcium iodate to calcium hydroxide of 0.46:1.

EXAMPLE 7

The procedure of Example 2 was repeated except that the temperature was 525° C. and 75.37 grams of calcium iodate were admixed with 24.63 grams of calcium hydroxide to provide a mole ratio of calcium iodate to calcium hydroxide of 0.61:1.

EXAMPLE 8

One hundred grams of calcium iodate alone were heated at a temperature of 575° C. for a period of about one hour.

EXAMPLE 9

One hundred grams of calcium iodate alone were heated at a temperature of 660° C. for a period of one hour.

Each of the products obtained in foregoing examples 2 to 9 inclusive was analyzed for local iodine content, and for the ions orthoperiodate iodate, and iodide, each of which ions was calculated to the corresponding calcium compound.

The results are set forth in Table 1.

TABLE 1

| Example | Mole ratio Ca(IO$_3$)$_2$:Ca(OH)$_2$ | Temperature,° C. | Percent Penacalcuim orthoperiodate | Calcuim iodate | Calcuim iodide | Total iodine | Weight loss on heating | Percent of total initial iodine (as I$_2$) lost |
|---|---|---|---|---|---|---|---|---|
| 2 | 0.15:1 | 495 | 60.7 | 8.8 | 0.25 | 29.8 | 5.9 | 0.5 |
| 3 | 0.15:1 | 520 | 64.2 | 7.9 | 0.15 | 30.4 | 10.4 | 21 |
| 4 | 0.08:1 | 495 | 41.1 | 4.4 | 0.7 | 19.6 | 8.7 | Nil |
| 5 | 0.3:1 | 455 | 81.0 | 6.7 | 0.44 | 36.7 | 15.4 | 20.4 |
| 6 | 0.46:1 | 465 | 73.0 | 17.0 | 0.29 | 40.3 | 24.8 | 32.1 |
| 7 | 0.61:1 | 525 | 72.0 | 19.0 | 1.1 | 41.9 | 31.3 | 40.8 |
| 8 | 1 ∞ | 575 | 9.0 | 88.9 | 0 | 61.4 | 20.7 | 24.4 |
| 9 | 1 ∞ | 660 | 68.6 | 22.9 | 1.5 | 43.1 | 63.9 | 75.9 |

[1] No calcuim hydroxide.

The results of Examples 2 to 7 inclusive demonstrate that a mole ratio of calcium iodate to calcium hydroxide from about 0.08:1 to about 0.6:1 is operable to provide the pentacalcium orthoperiodate compositions of the present invention, although the preferred mole ratio of calcium iodate to calcium hydroxide is about 0.15:1.

Examples 8 and 9 are illustrative of the well known process for preparing pentacalcium orthoperiodate by the thermal decomposition of calcium iodate alone. The equation for such reaction is as follows:

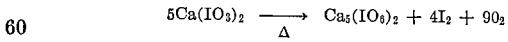

$$5Ca(IO_3)_2 \xrightarrow{\Delta} Ca_5(IO_6)_2 + 4I_2 + 9O_2$$

As is seen from the equation, the theoretical maximum yield of pentacalcium orthoperiodate, based on calcium iodate, is only 33 percent by weight. Or to state it differently, there is a loss of 67 percent of product in this reaction due to the formation of volatile iodine and oxygen. This excessive loss of iodine is prohibitive from an economic standpoint and effectively precludes the commercial use of thermal decomposition of calcium iodate for the preparation of pentacalcium orthoperiodate.

Thus, in Example 8 where the temperature of reaction is controled at about 575° F., there is only a 9 percent conversion to pentacalcium orthoperiodate. Where the thermal decomposition of calcium iodate is conducted at a higher temperature, as in Example 9, although conversion to pentacalcium orthoperiodate is accomplished, there is a concomitant iodine loss of 75.9 percent, which loss is totally unacceptable from an economic point of view.

Resistance to preferential leaching by water

When an iodized salt block is exposed to rainfall or high humidity, it loses salt in the form of brine. This brine contains iodine in proportion to the solubility of the iodine source used. Ideally, the brine should contain an iodine to salt ratio equal to that in the initial block. This would result in the block itself maintaining its initial iodine to salt ratio throughout its entire life.

Since the leaching ratio is defined as:

$$\frac{\text{Iodine/salt ratio in the leachings}}{\text{Iodine/salt ratio in the original salt block}}$$

the ideal situation would give a leaching ratio of 1.0. If the iodine is being preferentailly leached from the block, the leaching ratio will exceed 1.0, and the numeral value will be a relative indication of the degree of preferential leaching. If the leaching ratio is less than 1.0, a rather insoluble iodine source is indicated, meaning that iodine content of the remaining block is being maintained or perhaps even slightly increased. To make a comparison of leaching ratios, a standard test called the leaching ratio test was developed, in which salt pellets containing various iodine sources were subjected to leaching in order to determine their iodine leaching characteristics. A complete description of the leaching ratio test method follows.

Leaching ratio method (A) Preparation of test pellets.—Ten gram salt pellets were used to evaluate this stability of various iodine sources toward leaching. These pellets have weathering characteristics similar to those of salt blocks. The test pellets were formed in a slightly tapered die on a Carver hydraulic press. Formation pressure was 22,000 pounds per square inch. Approximate pellet dimensions were as follows:

| | Inch |
|---|---|
| Diameter | 1 |
| Thickness | 0.33 |

The pellet size and shape can be approximated by stacking five twenty-five cent coins.

A basic pentacalcium orthoperiodate composition prepared according to Example 2, containing about 64% by weight of pentacalcium orthoperiodate, was tested for leaching properties, by admixing 0.0345 gram of this product with 100 grams of salt to provide an iodized mixture containing about 0.01 percent by weight of iodine. This mixture was pelletized as previously described.

The pellet was weighed on an analytical balance, then exposed in a desiccator at 100% relative humidity for a period of four days. During this time the test pellet absorbed moisture, forming a brine which dripped into a beaker.

The brine was collected, measured, and analyzed for both salt and iodine content; from these values, the leaching ratio was calculated. As a check on the accuracy of the iodine analysis, the leached pellet remaining was also analyzed for iodine content; total iodine found in the leached pellet plus the leachings was compared with the known initial iodine content.

Results

A leaching ratio of approximately 1.0 was obtained indicating that the basic calcium orthoperiodate composition is not subject to preferential leaching from a salt block.

Quick leach method

The leaching ratio method is quite satisfactory for the final laboratory testing of iodizing materials. Being a lengthy procedure, however, it is not practicable as a method of screening numerous iodizing candidates. A more rapid means of screening, known as the "quick leach" method, has been developed. The chief function of this method is to approximate the results obtained by the leaching ratio method in a fraction of the time and to eliminate obviously unacceptable iodine candidates. The test is carried out as follows:

A 0.10 gram sample of iodine candidate material is placed in 100 ml. of a concentrated brine (300 g. of sodium chloride per 1,000 ml. of solution) and shaken at intervals. The sample is filtered after one hour and the brine solution is analyzed for iodine content to arrive at the quantity of iodine leached from the sample. The quick leach, expressed as a percent, is calculated as follows:

$$\frac{\text{Grams iodine in solution} \times 100}{\text{Grams iodine in original 0.1 gram sample}} = \text{Percent quick leach}$$

Analysis of six different samples by the leaching ratio and quick leach methods respectively gave the following results:

| Sample | Leaching ratio | Quick leach |
|---|---|---|
| I | 0.33 | 1.2 |
| II | 0.54 | 5.7 |
| III | 0.53 | 2.6 |
| IV | 1.30 | 11.3 |
| V | 2.87 | 17.0 |
| VI | 3.58 | 28.2 |

The graph obtained by plotting the values obtained for leaching ratio along the ordinate versus the values obtained for quick leach along the abscissa is indicated in the attached drawing.

The attached graph shows the correlation of leaching ratio and quick leach. A quick leach value of 7.0, indicating that 7% of the total iodine in the sample is leachable, corresponds to a leaching ratio of 1.0. Quick leach values less than 1.0 indicate the desired degree of insolubility in the leaching medium, whereas values greater than 1.0 indicate proportionately greater dissolution than desired.

The compositions of Examples 2 to 9 inclusive were tested for resistance to aqueous leaching when incorporated into a salt block by the aforedescribed quick leach method. The results obtained were as follows:

| Composition: | Quick leach |
|---|---|
| Example 2 | 6.8 |
| Example 3 | 8.4 |
| Example 4 | 2.9 |
| Example 5 | 3.9 |
| Example 6 | 3.9 |
| Example 7 | 3.3 |
| Example 8 | 89.0 |
| Example 9 | 6.4 |

It is seen from the graph that the quick leach values of Examples 2 to 7 inclusive correspond to leaching ratio values of from about 1 to about 0.5, which values attest to the leach resistant characteristics of the foregoing compositions when incorporated into salt blocks. The unacceptable quick leach of 89.0 for Example 8 correlates with a pentacalcium orthoperiodate content of only 9.0%. Although the quick leach value of 6.4 for the composition of Example 9 is satisfactory, the 75.9% loss of iodine in the preparation of pentacalcium orthoperiodate by thermal decomposition of calcium iodate precludes the commercial use of this process.

Toxicity

The oral toxicity of a basic pentacalcium orthoperiodate composition containing about 60% pentacalcium orthoperiodate and a total iodine content of 29.03% as $I_2$ was determined, together with calcium iodate as a control, in the following manner:

Each of the products was administered as a 25% aqueous suspension of groups of five fasted male albino rats of the Sprague-Dawley strain weighing 106–146 grams. The oral administration was performed by the use of a syringe with a modified 17 gauge hypodermic needle as an oral feeding tube. The animals were observed following dosing and over a subsequent fourteen-day observation period. At the conclusion they were weighed and sacrificed.

Calculation of the $LD_{50}$ and 95% confidence limits was performed by the method of moving averages, using the tables constructed by Weil (Weil, C. S.: Tables for Convenient Calculation of Median Effective Dose ($LD_{50}$ and $ED_{50}$) and Instruction in Their Use, Biometrics, 8, 249 (1952)).

From the number and distribution of deaths that occurred the acute rat oral $LD_{50}$ of the pentacalcium orthoperiodate composition was found to be 7.07 (No Range Calculable) gm./kg. and the acute rat oral $LD_{50}$ of the calcium iodate control was calculated to be 3.53 gm./kg. Based upon the iodine content of the samples, the $LD_{50}$ for basic pentacalcium orthoperiodate is 2.05 gm./kg. and for the calcium iodate 2.28 gm./kg., demonstrating that the toxicity of pentacalcium orthoperiodate is comparable to that of calcium iodate.

Nutritional availability or assimilability

Rat feeding tests were conducted to determine the nutritional availability or assimilability as evidenced by the effectiveness of pentacalcium orthoperiodate as a dietary supplement in preventing iodine deficiency. Iodine deficiency is manifested by an increased thyroid gland size. A "low Iodine" Test Diet was prepared as follows:

| Diet: | Percent |
|---|---|
| Yellow corn meal (grown in iodine deficient area) | 78 |
| Wheat gluten | 18 |
| Brewer's yeast U.S.P. | 2 |
| Calcium carbonate | 1 |
| Sodium chloride | 1 |

Portions of this diet were fortified separately with two well known iodine sources, potassium iodide and calcium iodate, and with a basic pentacalcium orthoperiodate composition respectively. To insure a uniform mixture, the pulverized iodine compounds (16 to 44 mg.) were premixed with a small amount (100 g.) of the test diet. The premix was then thoroughly blended with increasing amounts of diet until the desired concentration was obtained. Enough of each mix was prepared to last the eight weeks of the test.

The amount of iodine added to the diets was chosen at 150 micrograms per kilogram of feed since it has been determined that differences between compounds show up best at this level.

Analysis of the diets for iodine gave the following results:

| | Micrograms of iodine per kilogram of feed | | |
|---|---|---|---|
| Low iodine diet as received: | | | |
| Sample 1 | 42.5 | | |
| Sample 2 | 42.5 | | |
| Average | 42.5 | | |
| Diet with 150 microg./kg. of $I_2$ (as potassium iodide) added: | | | |
| Sample 1 | 194 | | |
| Sample 2 | 191 | | |
| Average | 192.5— | 42.5= | 150.00 |
| Diet with 150 microg./kg. of $I_2$ (as $Ca(IO_3)_2$) added: | | | |
| Sample 1 | 197 | | |
| Sample 2 | 188 | | |
| Average | 192.5— | 42.5= | 150.00 |
| Diet with 150 microg./kg. of $I_2$ as pentacalcium orthoperiodate ($Ca_5(IO_6)_2$) added: | | | |
| Sample 1 | 188 | | |
| Sample 2 | 194 | | |
| Average | 191— | 42.5= | 148.5 |

Weanling (21 days) Sprague-Dawley female albino rats were individually weighed and randomly distributed two per cage in twenty cages. Free choice of feed was allowed from a cup with a top and a hole in the middle to minimize spillage. Feed consumption was determined by recording the amount added to each cage. Spillage was determined by collecting it in a pan to the center of which the feed cup was fastened and in a tray under the cage. No significant amount of spillage was observed in any of the cages. Water was available at all times from water bottles on the sides of the cages.

Weight gains were determined by weighing the rats individually at the start and at the end of the experiment. One rat in each cage was marked with black ink on the top of its head for identification.

The duration of the experiment was eight weeks.

At the end of eight weeks the animals were sacrificed and the thyroid glands were carefully removed and weighed. The results are tabulated in Table 2.

TABLE 2.—RESULTS OF RAT FEEDING TEST

| | Control | Potassium iodide | Calcium iodate | Basic pentacalcium orthoperiodate composition |
|---|---|---|---|---|
| Iodine added to feed micrograms per kilogram | None | 150 | 150 | 150 |
| Total iodine by analysis micrograms per kilogram | 42.5 | 192.5 | 192.5 | 191.0 |
| Number of rats | 10 | 10 | 10 | 10 |
| Average feed consumption for 8 weeks, grams per rat | 577 | 610 | 618 | 618 |
| Average final body weight, grams | 144 | 152 | 152 | 154 |
| Average initial body weight, grams | 43 | 44 | 44 | 45 |
| Average weight gain, grams | 101 | 108 | 108 | 109 |
| Average weight of thyroid, milligrams | 30.8 | 14.9 | 17.0 | 16.2 |
| Average weight of thyroid, milligrams per 100 grams body weight | 21.4 | 9.8 | 11.3 | 10.5 |

The average weight gain together with the decreased weight of the thyroid gland attest to the fact that pentacalcium orthoperiodate is as assimilable and effective as potassium iodide or calcium iodate in preventing iodine deficiency.

While several embodiments of this invention are suggested above, it will be understood of course that the invention is not to be limited thereto, since many modifications may be made and it is contemplated therefore by the appended claims to cover any such modifications as fall within the true spirit and scope of this invention.

We claim:

1. A salt block comprising a major proportion of sodium chloride and a minor proportion, but at least about 0.005 weight percent of pentacalcium orthoperiodate as an iodine source sufficient to provide effective dietary iodine supplementation when said block is ingested by an animal in free choice animal feeding.

2. A salt composition in self-supporting form useful as an assimilable source of iodine for free choice animal feeding comprising (I) a major proportion of sodium chloride and (II) a minor proportion of an iodine source comprising an admixture of at least about 0.005 weight percent of pentacalcium orthoperiodate and at least one compound selected from the group consisting of calcium carbonate, calcium hydroxide, calcium oxide, and calcium iodate, said composition in self-supporting form containing pentacalcium orthoperiodate in a concentration of at least about 0.005 weight percent, but sufficient to provide effective dietary iodine supplementation when said composition is ingested by an animal.

3. The composition of claim 2 wherein said iodine source comprises an admixture of a major proportion of pentacalcium orthoperiodate and a minor proportion of at least one compound selected from the group consisting of calcium carbonate, calcium hydroxide, calcium oxide, and calcium iodate.

References Cited

UNITED STATES PATENTS

| 2,276,503 | 3/1942 | McHan | 424—150 |
| 2,550,015 | 4/1951 | Maffitt | 424—150 |

SAM ROSEN, Primary Examiner

U.S. Cl. X.R.

424—150

UNITED STATES PATENT OFFICE
CERTIFICATE OF CORRECTION

Patent No. 3,749,579     Dated July 31, 1973

Inventor(s) George F. Andelfinger and Eugene J. Kuhajek

It is certified that error appears in the above-identified patent and that said Letters Patent are hereby corrected as shown below:

| | | |
|---|---|---|
| Col. 4, l. 7 | — | "pentaclium" should be "pentacalcium" |
| Col. 6, l. 29 | — | "local" should be "total" |
| Col. 6, Table 1, last column in table, l. 2 | — | "21" should be "2.1" |
| Col. 7, l. 22 | — | "numeral value" should be "numerical value" |
| Col. 9, l. 16 | — | "of groups" should be "to groups" |
| Col. 9, l. 17 | — | "106-146" should be "105-146" |

Signed and sealed this 19th day of March 1974.

(SEAL)
Attest:

EDWARD M. FLETCHER, JR
Attesting Officer

C. MARSHALL DANN
Commissioner of Patents